United States Patent
Ryan

(10) Patent No.: US 6,188,832 B1
(45) Date of Patent: Feb. 13, 2001

(54) METHOD AND APPARATUS FOR MODIFICATIONS MADE TO A VIDEO SIGNAL TO INHIBIT THE MAKING OF ACCEPTABLE VIDEOTAPE RECORDINGS

(75) Inventor: John O. Ryan, Cupertino, CA (US)

(73) Assignee: Microvision Corp, Sunnyvale, CA (US)

( * ) Notice: Under 35 U.S.C. 154(b), the term of this patent shall be extended for 0 days.

(21) Appl. No.: 09/171,849

(22) PCT Filed: May 7, 1997

(86) PCT No.: PCT/US97/07790

§ 371 Date: Oct. 23, 1998

§ 102(e) Date: Oct. 23, 1998

(87) PCT Pub. No.: WO97/42755

PCT Pub. Date: Nov. 13, 1997

(51) Int. Cl.⁷ .................................................. H04N 5/91
(52) U.S. Cl. .................................... 386/94; 380/204
(58) Field of Search .................................. 386/94, 1, 46; 380/204, 203; 360/60; H04N 5/91

(56) References Cited

U.S. PATENT DOCUMENTS

| | | |
|---|---|---|
| 4,163,253 | 7/1979 | Morio . |
| 4,475,129 | 10/1984 | Kagota . |
| 4,571,642 * | 2/1986 | Hofstein .................................. 386/94 |
| 4,577,216 | 3/1986 | Ryan . |
| 4,631,603 | 12/1986 | Ryan . |
| 4,819,098 | 4/1989 | Ryan . |
| 4,888,649 * | 12/1989 | Kagota ................................... 386/94 |
| 4,907,093 * | 3/1990 | Ryan ...................................... 380/204 |
| 5,130,810 | 7/1992 | Ryan . |
| 5,134,496 | 7/1992 | Schwab . |
| 5,251,041 | 10/1993 | Young . |
| 5,394,470 | 2/1995 | Buynak . |
| 5,583,936 | 12/1996 | Wonfor . |
| 5,585,929 | 12/1996 | Young . |

* cited by examiner

Primary Examiner—Wendy Garber
Assistant Examiner—Vincent F. Boccio
(74) Attorney, Agent, or Firm—Gerow Brill; Frank Nguyen

(57) ABSTRACT

A video signal is modified so that a television/receiver still produces a normal picture from the modified signal, whereas videotape recording of this signal produces generally unacceptable pictures. Videotape recorders have an automatic gain control circuit (FIG. 2) which measures the sync pulse level in a video signal and develops a gain control correction signal for keeping the video applied to an FM modulator in the videotape recording system at a fixed predetermined level. A portion of the back porch intervals following the trailing edges of a substantial number of sync pulses are significantly raised and lowered to improve the playability of the original signal without reducing the effectiveness of the copy protection of the copied signal. This is achieved most simply by adding pulses to selected lines of the video signal during the back porch interval, which pulses significantly raise or lower the voltage amplitude during the blanking interval so to provide a signal where the average value is approximately equal to the blanking interval. The sync level and the sync duration on the selected lines are also reduced to enhance the effectiveness of the process.

14 Claims, 2 Drawing Sheets

METHOD AND APPARATUS FOR MODIFICATIONS MADE TO A VIDEO SIGNAL TO INHIBIT THE MAKING OF ACCEPTABLE VIDEOTAPE RECORDINGS

CROSS REFERENCE TO RELATED APPLICATIONS

This application is related to Provisional application Ser. No. 60/017,859 filed John O. Ryan on May 8, 1996 entitled METHOD FOR MODIFICATIONS TO A VIDEO SIGNAL TO INHIBIT THE MAKING OF ACCEPTABLE VIDEOTAPE RECORDING. This application is a related to U.S. Pat. No. 5,583,936 ('936) entitled VIDEO COPY PROTECTION PROCESS ENHANCEMENT TO INTRODUCE HORIZONTAL AND VERTICAL PICTURE DISTORTIONS by Wonfor et al., issued on Dec. 10, 1996. This application is also related to U.S. Pat. No. 4,819,098 ('098), issued on Apr. 4, 1989 entitled A METHOD AND APPARATUS FOR CLUSTERING MODIFICATIONS MADE TO A VIDEO SIGNAL TO INHIBIT THE MAKING OF ACCEPTABLE VIDEOTAPE RECORDINGS. This application is also related to U.S. Pat. No. 5,130,810 ('810), issued Jul. 14, 1992 entitled METHOD AND APPARATUS FOR PROCESSING A VIDEO SIGNAL SO AS TO PROHIBIT THE MAKING OF ACCEPTABLE VIDEOTAPE RECORDING.

BACKGROUND OF THE INVENTION

This invention relates to a method and apparatus for modifying a video signal so that a videotape recording of a video signal produces generally unacceptable pictures while a television monitor/receiver produces a generally normal picture from the modified signal. There exists a need for a method and system for modifying a video signal so that the signal produces a normal color picture on a television receiver, but videotape recording of the video signal is inhibited or prevented.

Some of the early work resulted in methods which are not satisfactory. For example, U.S. Pat. No. 4,163,253 was issued to Morio et al. in July of 1979. This patent describes an arrangement in which a positive pulse is added to the back porch portion of each horizontal blanking interval. This approach results in significant playability problems. In this connection, video cassette recorders designed for the consumer market place invariably feature some form of automatic gain control circuitry (AGC). The AGC circuit insures that the video level applied to the FM modulator in the recording system remains at a fixed, predetermined value, even if the video level applied to the machine's input terminal varies widely about the nominal value. Without an AGC system, high level signals would be distorted and clipped and low level signals would be marred by the noise and interference products generated by the recording process. If the input level dropped to less than ⅓ of normal value, the replayed signal might not even be strong enough to reliably synchronize the receiver's timbales, hence giving rise to noisy unstable pictures. This early system, however, did not take into consideration the fact that many television monitor/receivers use the back portion region of a video signal for black-level clamping. The result is that while the approach described in the Morio et al. patent of confusing the AGC of a video cassette recorder does result in a copied tape being generally unviewable, the video signal also does not provide viewable pictures on many television monitor/receivers when it is used directly. This makes the process of limited value.

Another example of earlier work in the field of video copy protection is the work of Kagota in U.S. patent Ser. No. 4,475,129. This work generates a first pulse in the back porch of a horizontal blanking signal with a width narrower than the back porch and adding a second pulse substantially equal to the first pulse. These pulses are added to the back porch at predetermined time intervals. The approach used by Kagota has many of the same problems of Morio. The effectiveness of the copy protection does result in a copies tape being generally unviewable but the video signal does not provide viewable pictures on many television monitors/receivers when it is used directly. This make the process of low commercial value.

The instant inventor is responsible for more recent and more successful approaches to preventing the unauthorized recording of a video signal. Three of such approaches are described in U.S. Pat. Nos. 4,577,216, 4,631,603 and 4,819,098. Additionally the instant inventor is a co-inventor of U.S. Pat. No. 5,583,986. U.S. Pat. Nos. 4,577,216, 4,631,603, 4,819,098, 4,513,081 and 5,583,986 are incorporated herein by reference. The approach described and claimed in U.S. Pat. No. 4,631,603 and the approach described and claimed in U.S. Pat. No. 4,819,098 ('098) are similar to the Morio et al. arrangement, in that they rely on confusing the AGC of a video cassette recorder. They differ from the Morio et al. arrangement, however, in a major aspect. As in Morio, they rely on differences between a video cassette recorder and a television receiver to assure that while the modifications made to a video signal prevent copying by a video cassette recorder, they do not significantly affect the playability of such signal on a conventional television monitor/receiver. The '098 patent uses a different approach for modifying a composite video signal to confuse the AGC of a video cassette recorder as described above, while not materially affecting the playability of the resulting signal. That is, it has been found that by "clustering" during a field the modifications to a composite video signal responsible for confusing the AGC circuitry of a video cassette recorder, the effect of such modification on the playability of the video signal on a television receiver/monitor is significantly attenuated. Most desirably, the modifications of the signal take place during that portion thereof which is responsible for vertical blanking, i.e., the return of a beam sweep from the end of a raster scan field to the beginning. The video signal does not provide during such time a viewable portion of a video picture, with the result that any effect of the modifications to the video signal on the circuitry of a television receiver/monitor will not occur during a viewing interval. Thus, the deleterious affect on playability is virtually eliminated. While the '098 patent provides a very useful copy protection means, the "clustering" must be done carefully to balance between the effectiveness of the copy protection and the playability of the original signal.

The '810 patent has an embodiment, as described in FIG. 4 of the '810 patent, wherein the video level of the back porch area is lowered below the normal blanking level. This reduction has the affect of increasing the gain of the AGC system so as to cause the recorded picture to be brighter than normal and have a washed out look. This reduction of blanking level in the back porch area is not accompanied by an AGC pulse. There this lowering of the blanking level serves a different purpose than desired in the instant invention.

One of the elements described in the '936 patent includes the concept of horizontal sync narrowing so that when an illegal copy is made, the attenuated video with reduced sync pulse width (duration) causes a playability problem when viewed on a TV set. While this concept is useful in the instant invention, as will be seen below, the reason for reducing the sync width in the instant invention goes beyond improved effectiveness in the copy protection.

SUMMARY OF THE INVENTION

It therefore is an object of this invention to provide a method and apparatus for modifying a video signal so that a conventional television monitor/receiver product a normal picture from the modified signal, whereas a videotape recording made from the modified signal is rendered unacceptable.

It is a particular object of this invention to provide such a method and apparatus in which the voltage amplitudes of a portion of the back porch intervals following the trailing edges of a substantial number of sync pulses are significantly raised and lowered to improve the playability of the original signal without reducing the effectiveness of the copy protection of the copied signal. This is achieved most simply by adding pulses to selected lines of the video signal during the back porch interval, which pulses significantly raise and lower the voltage amplitude during the blanking interval so to provide a signal the average value is approximately equal to the blanking level. The sync level and the sync duration on the selected lines are also reduced.

Other objects and advantages of the present invention will appear from the detailed description taken in conjunction with the accompanying drawings.

BRIEF DESCRIPTION OF THE DRAWINGS

With reference to the accompanying drawings.

DETAILED DESCRIPTION

It is known that by modifying certain characteristics of a video signal, the automatic gain control circuits in a videotape recorder can be forced to behave as if the video signal was much larger than it actually is. The result is that when the signal is recorded on tape, the recording is at such a low level that on replay a television monitor/receiver produces noisy unstable pictures. It has been discovered that by controlling the modifications to have an average value approximately equal to the blanking level while having peak levels both positive and negative of substantial values the effect of the copy protection modifications on the black-level control circuitry of a television monitor/receiver is minimized. Having these modifications inserted in a controlled fashion during the horizontal blanking interval, from a viewer's standpoint the affect is virtually eliminated.

Figure 1:
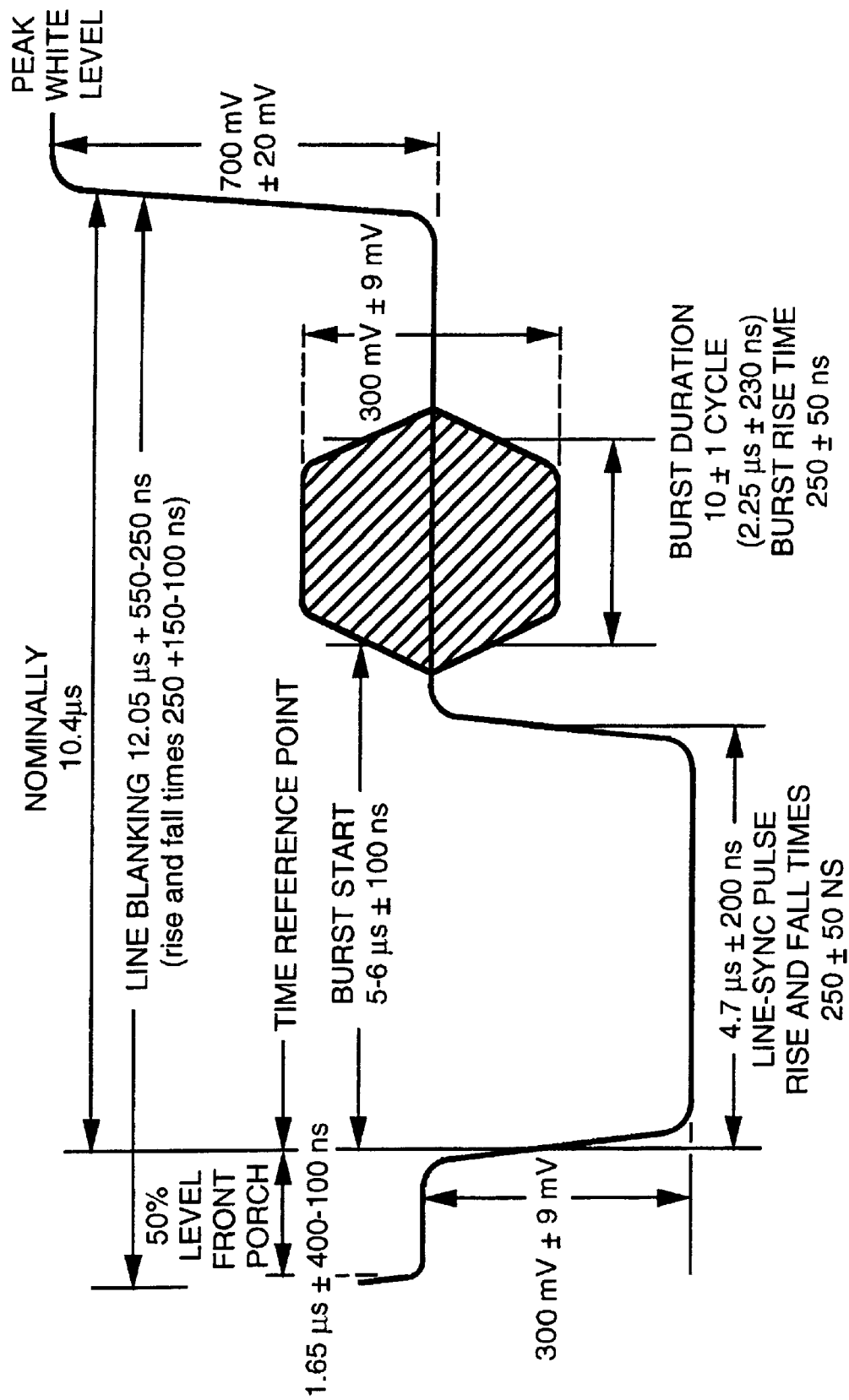
FIG. 1 is an illustration of that portion of the waveform of a typical color video signal responsible for one horizontal trace and return.

Turning now to FIG. 1, the waveform of that portion of a typical color video signal responsible for one horizontal scan trace and return is illustrated. The only 2 features of this waveform portion which remain constant despite changes in picture content are those which occur during the blanking intervals, notably the sync pulses and color burst. Because the level of the color burst is highly dependent upon tuner response, the level of the sync pulses (any of the pulses which go from blanking level to a sync tip level, including equalizing pulses and vertical sync pulses) are almost always used as the reference level in automatic gain control systems of videotape recorders. Sync pulses are also almost always used as a reference level in the black-level control systems of television monitors/receivers, as well.

Figure 2:
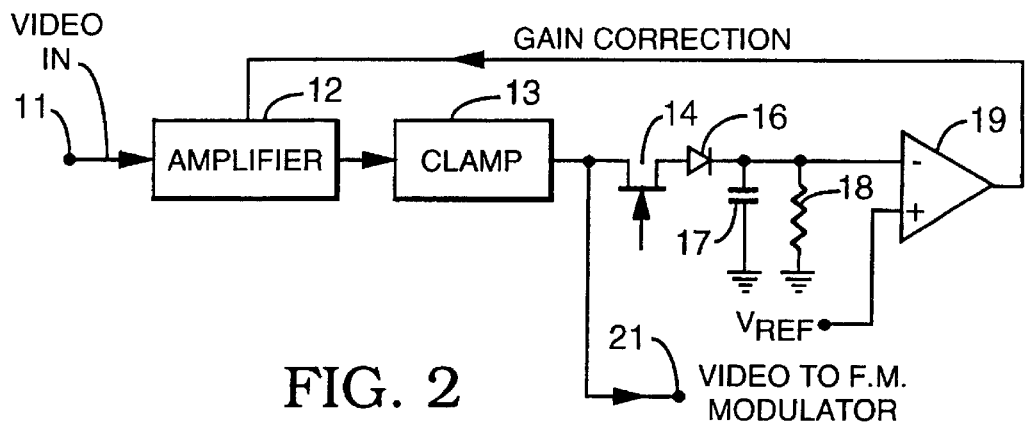
FIG. 2 is a block diagram of a typical automatic gain control circuit of a videotape recorder.

Referring now to FIG. 2, a typical automatic gain or level control system as utilized in videotape recorders is illustrated. In the typical system illustrated in FIG. 2, a Video In signal at a terminal 11 passes through an amplifier 12 and to a sync-tip clamp or DC restorer circuit 13, which establishes the sync tip voltage at some value V 1. A sampling circuit consisting of a transistor switch 14 and a positive peak detector, including diode 16, capacitor 17, and resistor 18, measures the voltage of the video signal just after the trailing edge of the sync pulse to yield a voltage V2. The difference voltage (V2—V1) is a measure of the sync pulse level. A differential amplifier 19 compares this sync pulse voltage with a reference voltage V,eff, and generates at its output an error or gain correction signal which is coupled back to the amplifier 12. This negative feedback arrangement insures that the signal level of the video signal applied to an FM modulator input at terminal 21 remains constant at the signal level value chosen by the designer of the circuit.

Figure 3:
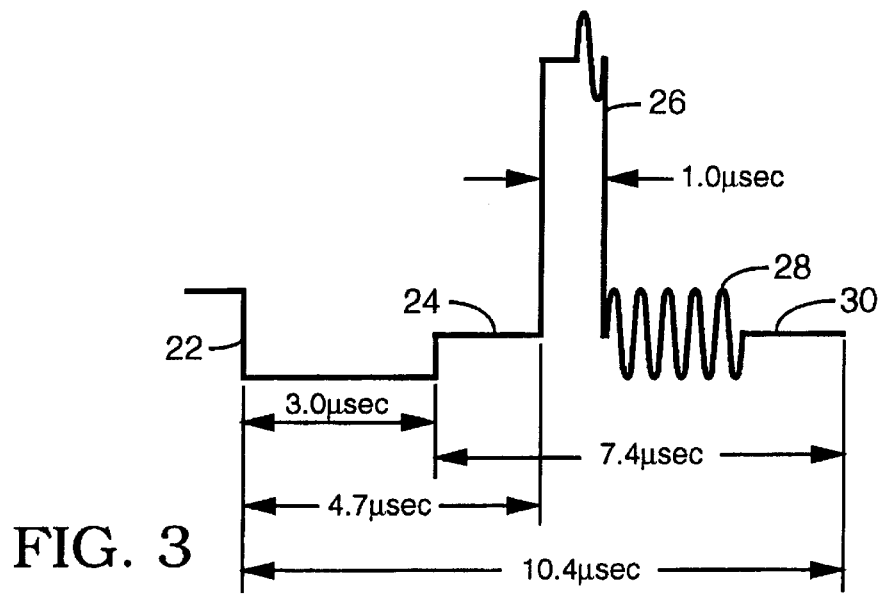
FIG. 3 illustrates a portion of a composite video signal waveform as modified in accordance with the invention.

Turning now to a consideration of FIG. 3, there is illustrated a portion of a waveform of a video signal modified in accordance with one embodiment of the present invention. The waveform portion illustrated in FIG. 3 is a portion of a video signal during horizontal blanking. Referring to FIG. 3, it can be seen that a positive pulse 22 has been added to the video signal immediately following the trailing edge of a sync pulse 23. For maximum affect, the amplitude of this pulse should be such as to raise the back porch voltage to the level of peak white or greater as shown in FIG. 3. A typical value of this positive pulse would be 127 IRE units in the NTSC format. The pulse width of the positive pulse should be wide enough to overcome the limited video bandwidth of the recording video cassette recorder so as to be effective. This pulse should be at least 750 nsecs. For best effectiveness. This positive pulse causes the automatic gain control circuit the in a videotape recorder to assess the sync pulse level at about 3½ times its actual value. The feedback action of the automatic gain control circuit as discussed in connection with FIG. 2 will then reduce the signal at the FM modulator input to about 30% of the correct value in the ideal case. The replayed signal as recorded on the videotape recorder will, therefore, be well below normal level and have a poor signal/noise ratio. In many cases the signal will not be strong enough on replay to properly synchronize a television monitor/receivers' scanning circuits.

Immediately before and following the positive going pulse are negative going pulses in which the total area is approximately equal to the area under the preceding positive going pulse. The width of sync has been reduced in order to provide a larger portion of the area to be used for the negative pulse prior to the positive pulse. The sync narrowing is such that the narrowed sync pulse is approximately 3.0 $\mu$secs. The amplitude of the negative going pulse is less than the half the burst amplitude so as to avoid placing the burst signal below the sync level. The level of this negative going pulse may be below the slice threshold of the sync separator of the recording VCR. This slice threshold is discussed in detail in U.S. Pat. No. 5,194,965 by Quan, issued on May 16, 1993 (incorporated by reference). If this negative going pulse is greater than the slice threshold it may improve the effectiveness of the copy protection. This is because the recording VCR may observe this as a pseudo sync pulse.

The purpose of having the negative going pulse is to improve the playability of the original signal on a television monitor receiver. As discussed above, a recording video cassette recorder detects the peak values of the sync and the pulse are following the sync signal. However, a monitor/receiver tends to detect the average value of the area following the sync pulse, colloquially called the back porch. Since the area within the back porch comprises positive and negative pulses in which the area under the curves are approximately equal, the darkening effect caused by having only a positive going signal is significantly reduced in most television monitor/receivers.

For maximum effectiveness, the pulse pairs described above may be placed on all horizontal blanking intervals other than those within the vertical sync area. However, it may be desirable to determine a balance between effectiveness and playability by controlling the number of lines having the modifications. One such possibility is to place lines containing the modification in clusters of a least one line in various parts of the field.

The above description has used parameters from the NTSC/60 field format. However, the principles of the invention may be equally applied to PAL, SECAM and other 50 field formats.

Figure 4:
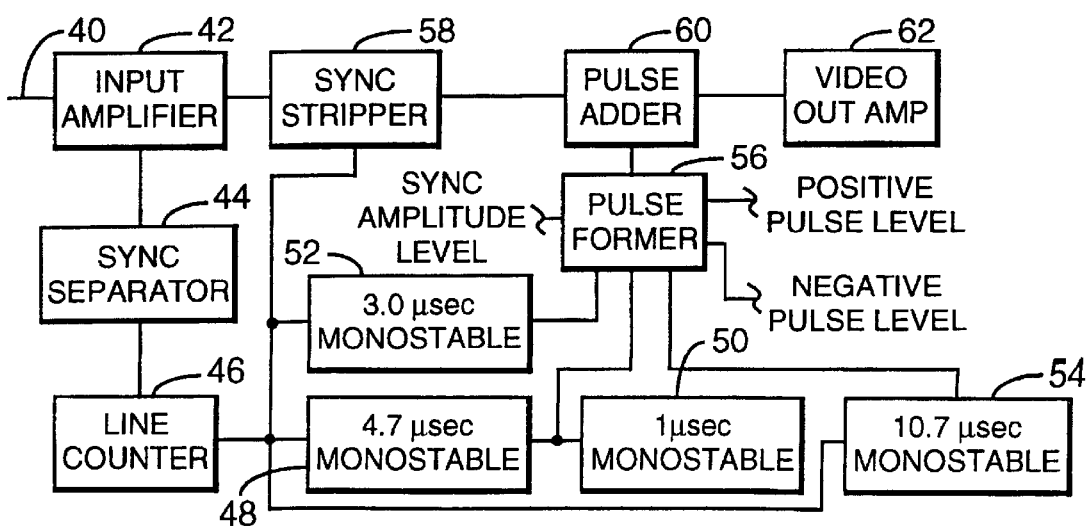
FIG. 4 is a block diagram of typical circuitry modifying a video signal waveform to produce waveform of FIG. 3.

Turning now to FIG. 4, there is shown a block diagram of typical apparatus which can be utilized to practice the method of the present invention as described above in connection with FIG. 3. It should be understood that many different kinds of circuit arrangements are possible to produce the modified signal, and the embodiment described in connection with the block diagram of FIG. 4 is exemplary only.

Referring to FIG. 4, incoming video signal at a terminal 42 is applied to a Input Amplifier 42. The output of Input Amplifier 42 is coupled to Sync Separator 44 where the synchronizing pulses are separated from the video signal. The output of Sync Separator 44 is coupled to Line Counter 46 which is preprogrammed to determine which lines in a field are to be modified. The output of Line Counter 46 is coupled to Sync Stripper 58 and Monstables 52, 48, and 54. Monstables 52, 48, 50 and 54 determine the pulse width of the various portions of the modified signal including the width of sync, and the positions of the positive and negative pulses as shown in FIG. 3. The outputs of Monstables 52, 48, 50 and 54 are coupled to Pulse former 56 which produces the pulse described in FIG. 3. These pulses are coupled to Pulse Adder 60 which receives a video signal that has been stripped of the synchronizing pulses on the selected lines. The color burst in the original signal remains intact at the input of Pulse Adder 60. Pulse Adder adds the pulses formed in Pulse Former 56 to the video signal. In the area where a pulse from Pulse Adder 56 and Color Burst coexist, they are simply added as shown in FIG. 3. The amplitudes of the positive pulse, the negative pulse and sync on the selected lines is determined in the Pulse Former as shown. The modified signal is coupled to Video Output Amplifier 62.

What has been described is a method along with exemplary apparatus for modifying a video signal so that a television receiver produces a normal picture from the modified signal, whereas a videotape recording of this signal produces generally unacceptable pictures. Many different forms of apparatus and circuits are possible for practicing the method of this invention, and the particular circuitry illustrated in FIG. 4 is by way of example only.

The parameters discussed above have been related to the NTSC television system. One skilled in the art could readily apply the principles of the invention the PAL and SECAM standards.

Various modifications are possible without departing from the true spirit and scope of the present invention. For example the duration of the added pulse may be set within a wide range of duration (0.5 to 5 microseconds). The amplitude of this pulse also may be varied and it may be of a shape other than rectangular, such as sine squared.

What is claimed is:

1. A method for processing a video signal so as to inhibit the making of acceptable videotape recordings therefrom while at the same the video is capable of producing a substantially normal picture on a television monitor/receiver, wherein the video signal has sync pulses followed by back porch intervals comprising the steps of:

selecting one or more lines within said video signal;

narrowing a width of the sync pulses on selected lines;

significantly lowering the voltage amplitude of a first portion of a widened back porch area on said selected lines;

significantly raising a voltage amplitude of a second portion of the back porch interval on said selected lines;

significantly lowering the voltage amplitude of a third portion of the back porch interval;

retaining the normal position of a color burst relative to the leading edge of said sync pulses; and wherein a sufficient number of lines are selected to inhibit the making of acceptable videotape recordings therefrom.

2. The method of claim 1 wherein said positive portion is at least 750 nsec. wide.

3. The method of claim 2 wherein said positive portion has an amplitude of approximately 127 IRE units.

4. The method of claims 1 through 3 wherein the sum of the area under said second portion is approximately equal to the area under the first and second portions.

5. The method of claim 1 wherein the selected lines comprise the lines containing a color burst signal.

6. The method of claim 1 wherein the selected lines comprise the last 6 lines preceding a vertical sync pulse in each field.

7. The method of claim 1 wherein the color burst signal begins approximately 5.6 $\mu$secs after the leading edge of the horizontal sync pulse.

8. The method of claim 1 wherein the color burst signal duration is approximately 2.25 $\mu$secs.

9. The method of claim 1 wherein the sync duration on selected lines is approximately 3.0 $\mu$secs.

10. The method of claim 1 wherein the sync amplitude is reduced to approximately −30 IRE units.

11. The method of claim 1 wherein the selected lines comprise a cluster of adjacent to a vertical blanking interval that form picture elements that are not displayed.

12. The method of claim 1 further including the step of reducing the level of each sync pulse.

13. The method of claim 1 wherein said selected lines are within a group thereof which occurs within no more than generally 20% of the video signal responsible for a field of a frame.

14. An apparatus for processing a video signal so as to inhibit the making of acceptable videotape recordings therefrom while at the same the video is capable of producing a substantially normal picture on a television monitor/receiver, wherein the video signal has sync pulses followed by back porch intervals comprising means for:

selecting one or more lines within said video signal;

narrowing a width of the sync pulses on selected lines;

significantly lowering the voltage amplitude of a first portion of a widened back porch area on said selected lines;

significantly raising a voltage amplitude of a second portion of the back porch interval on said selected lines;

significantly lowering the voltage amplitude of a third portion of the back porch interval;

retaining the normal position of a color burst relative to the leading edge of said sync pulses.

* * * * *

UNITED STATES PATENT AND TRADEMARK OFFICE
CERTIFICATE OF CORRECTION

PATENT NO. : 6,188,832 B1  
DATED : February 13, 2001  
INVENTOR(S) : John O. Ryan Page 1 of 1

It is certified that error appears in the above-identified patent and that said Letters Patent is hereby corrected as shown below:

Assignee: Macrovision Corp

Signed and Sealed this

Twenty-eighth Day of August, 2001

Attest:

NICHOLAS P. GODICI
*Attesting Officer*     *Acting Director of the United States Patent and Trademark Office*